(12) United States Patent
Hodono

(10) Patent No.: US 8,467,640 B2
(45) Date of Patent: Jun. 18, 2013

(54) OPTICAL SENSOR MODULE

(75) Inventor: Masayuki Hodono, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 13/211,096

(22) Filed: Aug. 16, 2011

(65) Prior Publication Data

US 2012/0051684 A1 Mar. 1, 2012

Related U.S. Application Data

(60) Provisional application No. 61/382,219, filed on Sep. 13, 2010.

(30) Foreign Application Priority Data

Aug. 31, 2010 (JP) .................................. 2010-194397

(51) Int. Cl.
G02B 6/12 (2006.01)
G02B 6/10 (2006.01)

(52) U.S. Cl.
USPC ................. 385/14; 385/52; 385/129; 385/130

(58) Field of Classification Search
None
See application file for complete search history.

(56) References Cited

U.S. PATENT DOCUMENTS

| 5,222,175 | A | * | 6/1993 | Tatoh | 385/93 |
| 5,265,184 | A | | 11/1993 | Lebby et al. | |
| 5,319,725 | A | | 6/1994 | Buchmann et al. | |
| 5,359,686 | A | * | 10/1994 | Galloway et al. | 385/49 |
| 5,428,704 | A | | 6/1995 | Lebby et al. | |
| 5,446,814 | A | | 8/1995 | Kuo et al. | |
| 5,521,992 | A | * | 5/1996 | Chun et al. | 385/14 |
| 5,780,875 | A | * | 7/1998 | Tsuji et al. | 257/81 |
| 5,835,646 | A | * | 11/1998 | Yoshimura et al. | 385/14 |
| 5,905,831 | A | | 5/1999 | Boudreau et al. | |

(Continued)

FOREIGN PATENT DOCUMENTS

| CN | 101002123 A | 7/2007 |
| CN | 101014889 A | 8/2007 |

(Continued)

OTHER PUBLICATIONS

European Search Report dated Jul. 13, 2010, issued in related European Patent Application No. 10159096.

(Continued)

Primary Examiner — Michelle R Connelly
(74) Attorney, Agent, or Firm — Westerman, Hattori, Daniels & Adrian, LLP

(57) ABSTRACT

An optical waveguide unit having board unit engaging vertical grooves and a board unit having engagement plate portions to be fitted in the vertical grooves and projections are individually produced, and the engagement plate portions and the projections are brought into fitting engagement with the vertical grooves of the optical waveguide unit. At this time, the projections are deformed to accommodate the tolerances of the components, thereby preventing wobbling and warpage of the board unit. Further, the vertical grooves of the optical waveguide unit are provided in proper positions with respect to a light transmission face of a core, and the engagement plate portions of the board unit are provided in proper positions with respect to the optical element. Therefore, the fitting engagement between the vertical grooves and the engagement plate portions permits proper positioning of the light transmission face of the core and the optical element for self-alignment.

4 Claims, 14 Drawing Sheets

U.S. PATENT DOCUMENTS

| | | | |
|---|---|---|---|
| 5,909,523 A * | 6/1999 | Sakaino et al. | 385/49 |
| 6,042,276 A * | 3/2000 | Tachigori | 385/88 |
| 6,088,498 A | 7/2000 | Hibbs-Brenner et al. | |
| 6,456,766 B1 * | 9/2002 | Shaw et al. | 385/47 |
| 6,541,762 B2 | 4/2003 | Kang et al. | |
| 6,912,333 B2 | 6/2005 | Mikawa et al. | |
| 6,917,056 B2 * | 7/2005 | Dautartas et al. | 257/98 |
| 7,063,467 B2 | 6/2006 | Nagasaka et al. | |
| 7,146,080 B2 * | 12/2006 | Neta et al. | 385/40 |
| 7,150,569 B2 | 12/2006 | Oono et al. | |
| 7,184,630 B2 | 2/2007 | Kwon et al. | |
| 7,310,457 B2 * | 12/2007 | Kotake | 385/14 |
| 7,313,293 B2 | 12/2007 | Murashima et al. | |
| 7,317,861 B2 | 1/2008 | Ohtsu et al. | |
| 7,333,682 B2 | 2/2008 | Kobayashi et al. | |
| 7,373,033 B2 | 5/2008 | Lu et al. | |
| 7,668,414 B2 | 2/2010 | Shemi et al. | |
| 7,724,988 B2 * | 5/2010 | Dellmann et al. | 385/14 |
| 7,898,736 B2 | 3/2011 | Jacobowitz et al. | |
| 8,014,638 B2 * | 9/2011 | Nakano et al. | 385/14 |
| 2002/0076161 A1 * | 6/2002 | Hirabayashi et al. | 385/40 |
| 2003/0219208 A1 | 11/2003 | Kwon et al. | |
| 2004/0001661 A1 * | 1/2004 | Iwaki et al. | 385/14 |
| 2004/0190831 A1 * | 9/2004 | Lu et al. | 385/49 |
| 2004/0234210 A1 | 11/2004 | Nagasaka et al. | |
| 2005/0100264 A1 | 5/2005 | Lu et al. | |
| 2005/0185892 A1 | 8/2005 | Kwon et al. | |
| 2005/0201667 A1 | 9/2005 | Neta et al. | |
| 2005/0207718 A1 | 9/2005 | Komura et al. | |
| 2006/0045410 A1 | 3/2006 | Trott et al. | |
| 2006/0093259 A1 * | 5/2006 | Oggioni et al. | 385/31 |
| 2007/0127865 A1 | 6/2007 | Lu et al. | |
| 2007/0297713 A1 | 12/2007 | Lu et al. | |
| 2008/0037927 A1 | 2/2008 | Kurihara et al. | |
| 2009/0016670 A1 | 1/2009 | Shemi et al. | |
| 2009/0116799 A1 | 5/2009 | Hodono | |
| 2009/0279827 A1 | 11/2009 | Sano et al. | |
| 2009/0285580 A1 | 11/2009 | Yasuda et al. | |
| 2010/0254666 A1 | 10/2010 | Hodono | |
| 2011/0026873 A1 * | 2/2011 | Hodono | 385/12 |
| 2011/0085758 A1 * | 4/2011 | Hodono | 385/12 |
| 2011/0135250 A1 | 6/2011 | Hodono | |
| 2011/0216995 A1 * | 9/2011 | Hodono | 385/12 |
| 2012/0027338 A1 * | 2/2012 | Hodono | 385/12 |
| 2012/0051684 A1 | 3/2012 | Hodono | |
| 2012/0201490 A1 * | 8/2012 | Naito et al. | 385/12 |

FOREIGN PATENT DOCUMENTS

| | | |
|---|---|---|
| CN | 101430401 A | 5/2009 |
| CN | 101859006 A | 10/2010 |
| EP | 0548440 A1 | 6/1993 |
| JP | 5-196831 A | 8/1993 |
| JP | 5196831 A | 8/1993 |
| JP | 2004-302345 A | 10/2004 |
| JP | 2008-102283 A | 5/2008 |
| JP | 2009-180723 A | 8/2009 |
| JP | 2011-033876 A | 2/2011 |
| JP | 2011033876 A | 2/2011 |
| JP | 2011-102955 | 5/2011 |
| WO | 2004015463 A1 | 2/2004 |
| WO | 2009/001969 A2 | 12/2008 |

OTHER PUBLICATIONS

Japanese patent application of 2009-180723, filed Aug. 3, 2009.
Chinese Office Action dated Aug. 22, 2012, issued in related Chinese Patent Application No. 201010244781.0 (5 pages).
U.S. Office Action dated Sep. 26, 2012, issued in related U.S. Appl. No. 12/847,121.
U.S. Office Action dated Apr. 27, 2011, issued in related U.S. Appl. No. 13/020,936.
U.S. Notice of Allowance dated Aug. 25, 2011, issued in related U.S. Appl. No. 13/020,936.
U.S. Notice of Allowance dated Oct. 25, 2012, issued in related U.S. Appl. No. 12/900,964.
U.S. Office Action dated Sep. 26, 2012, issued in related U.S. Appl. No. 13/361,230.
U.S. Notice of Allowance dated Oct. 1, 2012, issued in related U.S. Appl. No. 13/184,865.
U.S. Notice of Allowance dated Jan. 4, 2013, issued in corresponding U.S. Appl. No. 13/040,849.

* cited by examiner

RELATED ART even if Ls<Lc). Thus, the optical sensor module suffers from greater variations in optical coupling loss.

OPTICAL SENSOR MODULE

RELATED APPLICATIONS

This application claims the benefit of U.S. Provisional Application No. 61/382,219, filed on Sep. 13, 2010, which is hereby incorporated by reference.

BACKGROUND OF THE INVENTION

1. Field of the Invention

The present invention relates to an optical sensor module including an optical waveguide unit and a board unit mounted with an optical element.

2. Description of the Related Art

As shown in FIGS. 13A and 13B, an optical sensor module is produced by individually producing an optical waveguide unit $W_0$ including an under-cladding layer 71, a core 72 and an over-cladding layer 73 provided in this order, and a board unit $E_0$ including an optical element 82 mounted on a substrate 81, and then bonding the board unit $E_0$ to an end portion of the optical waveguide unit $W_0$ with an adhesive or the like with the core 72 of the optical waveguide unit $W_0$ in alignment with the optical element 82 of the board unit $E_0$. In FIGS. 13A and 13B, reference numerals 75 and 85 designate a base and a sealing resin, respectively.

The alignment between the core 72 of the optical waveguide unit $W_0$ and the optical element 82 of the board unit $E_0$ is generally achieved with the use of a self-aligning machine (see, for example, JP-A1-HEI5 (1993)-196831). In this self-aligning machine, the optical waveguide unit $W_0$ is fixed to a fixed stage (not shown) and the board unit $E_0$ is fixed to a movable stage (not shown) for the alignment. Where the optical element 82 is a light emitting element, an alignment position (at which the core 72 is properly aligned with the optical element 82) is determined, as shown in FIG. 13A, by changing the position of the board unit $E_0$ relative to one end face (light inlet) 72a of the core 72 with light $H_1$ being emitted from the light emitting element, monitoring the amount of light outputted from the other end face (light outlet) 72b of the core 72 through a lens portion 73b provided at a distal end of the over-cladding layer 73 (monitoring a photovoltaic voltage developed across a light receiving element 91 provided in the self-aligning machine), and then defining a position at which the light amount is maximum as the alignment position. Where the optical element 82 is a light receiving element, the alignment position is determined, as shown in FIG. 13B, by changing the position of the board unit $E_0$ relative to the one end face 72a of the core 72 with a predetermined amount of light (light emitted from a light emitting element 92 provided in the self-aligning machine and transmitted through the lens portion 73b provided at the distal end of the over-cladding layer 73) $H_2$ being inputted from the other end-face 72b of the core 72 and outputted through a tail end portion 73a of the over-cladding layer 73 from the one end face 72a of the core 72, monitoring the amount of light received by the light receiving element (monitoring a photovoltaic voltage), and defining a position at which the light amount is maximum as the alignment position.

The alignment utilizing the self-aligning machine is highly accurate, but unsuitable for mass production with the need for labor and time.

A conventional optical sensor module which permits easy alignment without the need for the aforementioned machine and labor is known (see Japanese Patent Application No. 2009-180723).

In the optical sensor module, as shown in plan in FIG. 14A and in perspective in FIG. 14B with its right end viewed from a right upper side, an optical waveguide unit $W_1$ includes an under-cladding layer 41 having opposite side extension portions (upper and lower portions on a right side in FIG. 14A) which extend in a core axial direction (in a rightward direction in FIG. 14A) and are free from a core 42, and an over-cladding layer 43 having opposite side extension portions which extend in association with the extension portions of the under-cladding layer 41. Extension portions 44 defined by these extension portions respectively have board unit engaging vertical grooves (engaging portions) 44a provided in a pair in proper positions thereof relative to a light transmission face (one end face) 42a of the core 42 as extending thicknesswise of the optical waveguide unit $W_1$. On the other hand, the board unit $E_1$ includes engagement plate portions (to-be-engaged portions) 51a provided in left and right edge portions (laterally opposite edge portions) thereof to be brought into fitting engagement with the vertical grooves 44a.

In the optical sensor module, the board unit $E_1$ is coupled to the optical waveguide unit $W_1$ with the engagement plate portions 51a of the board unit $E_1$ in fitting engagement with the vertical grooves 44a of the optical waveguide unit $W_1$. Here, the vertical grooves 44a are designed so as to be located in the proper positions with respect to the light transmission face 42a of the core 42, and the engagement plate portions 51a are designed so as to be located in proper positions with respect to an optical element 54. Therefore, the fitting engagement between the vertical grooves 44a and the engagement plate portions 51a permits self-alignment between the core 42 and the optical element 54. In FIGS. 14A and 14B, a reference character 45 designates a base, and a reference character 45a designates a through-hole provided in the base 45 for receiving the board unit $E_1$. Further, a reference character 51 designates a shaped substrate having the engagement plate portions 51a, and a reference character 55 designates a sealing resin.

Thus, the optical sensor module permits self-alignment between the core 42 of the optical waveguide unit $W_1$ and the optical element 54 of the board unit $E_1$ without the aligning operation. This eliminates the need for the time-consuming aligning operation, permitting mass production of the optical sensor module at higher productivity.

However, the optical sensor module often suffers from significant variations in optical coupling loss occurring between the core 42 and the optical element 54. The optical waveguide unit $W_1$ suffers from slight variations in a distance Ls between the pair of vertical grooves 44a thereof (a distance between bottoms 44b of the opposed vertical grooves 44a) (see FIG. 15A), and the board unit $E_1$ suffers from slight variations in the overall length Lc thereof (a distance between side edges 51b of the engagement plate portions 51a provided on the opposite sides thereof) (see FIG. 15B) in the production process. Although a relationship Ls=Lc should be satisfied according to design specifications, an actual relationship is Ls>Lc or Ls<Lc due to the tolerances of the components in the production process. If Ls>Lc, as shown in FIG. 15C, the board unit $E_1$ wobbles (see an arrow F in FIG. 15C), resulting in inaccurate alignment and hence greater variations in optical coupling loss. If Ls<Lc, as shown in FIG. 15(d), the board unit $E_1$ warps outward (in a direction such that the optical element 54 is displaced away from the light transmission face 42a of the core 42) to increase the optical coupling loss or, conversely, warps inward (in a direction such that the optical element 54 is displaced toward the light transmission face 42a of the core 42) in an non-illustrated manner to reduce the optical, coupling loss (in most cases, the board unit $E_1$ warps outward as shown in FIG. 15(*d*)). This results in greater variations in optical coupling loss. Because of the greater variations in optical coupling loss, the optical sensor module including the board unit $E_1$ and the optical waveguide unit $W_1$ engaged with each other has a room for improvement.

SUMMARY OF THE INVENTION

An optical sensor module which has smaller variations in optical coupling loss occurring between a core of an optical waveguide unit and an optical element of a board unit is provided. The optical sensor module includes: an optical waveguide unit; and a board unit coupled to the optical waveguide unit and mounted with an optical element; the optical waveguide unit including an under-cladding layer, a linear core provided on a surface of the under-cladding layer and serving as an optical path, an over-cladding layer covering the core, and board unit engaging portions provided in a pair in proper positions with respect to a light transmission face of the core in laterally opposite portions of the over-cladding layer; the board unit including a substrate, an optical element mounted on a predetermined portion of the substrate, to-be-engaged portions provided in a pair in proper positions with respect to the optical element in the substrate for fitting engagement with the board unit engaging portions, and a projection protruding laterally from at least one of the to-be-engaged portions and less rigid than the substrate; wherein the optical waveguide unit and the board unit are coupled to each other with the to-be-engaged portions and the projection of the board unit in fitting engagement with the engaging portions of the optical waveguide unit with the projection being deformed in abutment with a corresponding one of the engaging portions without warpage of the board unit.

The optical sensor module reduces vibrations in optical coupling loss occurring between the core of the optical waveguide unit and the optical element of the board unit and minimizes the optical coupling loss in the optical sensor module. The optical sensor module includes the optical waveguide unit and the board unit coupled to each other with the engaging portion of the optical waveguide unit in fitting engagement with the to-be-engaged portion of the board unit as shown in FIGS. 14A and 14B. More specifically, where a projection less rigid than the substrate is provided on at least one of the to-be-engaged portions of the board unit as protruding laterally from the one to-be-engaged portion, the projection deformable in abutment with the engaging portion to accommodate the tolerances of the components and, as a result, the board unit is stably coupled to the optical waveguide unit without the wobbling and the warpage of the board unit, thereby reducing the variations in optical coupling loss.

In the optical waveguide unit of the inventive optical sensor module, the board unit engaging portions, are located in proper positional relation with respect to the light transmission face of the core. In the board unit, the to-be-engaged portions to be brought into fitting engagement with the engaging portions are located in proper positional relation with respect to the optical element. With the to-be-engaged portions of the board unit in fitting engagement with the engaging portions of the optical waveguide unit, i.e., with the optical waveguide unit coupled to the board unit, self-alignment is established. In this state, the projection of the board unit is deformed in abutment with the engaging portion. Since the tolerances of the components are accommodated by the deformation, the wobbling and the warpage of the board unit are prevented. This reduces the variations in optical coupling loss occurring between the core of the optical waveguide unit and the optical element of the board unit.

In particular, the engaging portions provided in a pair in the laterally opposite portions of the optical waveguide unit may be vertical grooves extending thicknesswise of the optical waveguide unit, and the vertical grooves may each have a bottom having a width that is not greater than twice a thickness of each of the to-be-engaged portions. Further, the projection of the board unit may be positioned on the bottom of one of the vertical grooves. In this case, the board unit is more stably engaged with the optical waveguide unit. This more reliably prevents the wobbling and the warpage of the board unit.

Where the projection of the board unit is made of copper, the projection is easily deformable, facilitating the fitting engagement of the projection with the one vertical groove.

DETAILED DESCRIPTION OF THE INVENTION

Next, embodiments of the present invention will be described in detail with reference to the drawings.

Figure 1A:
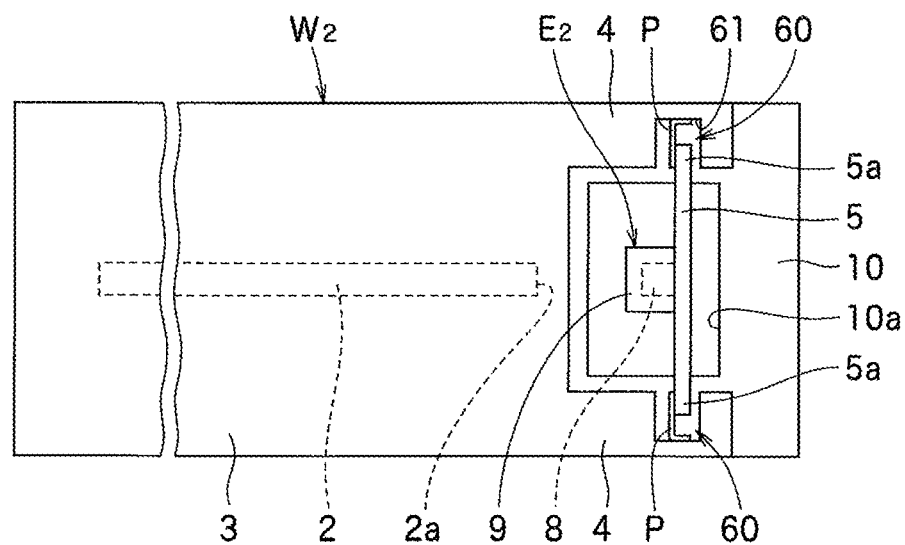
FIG. 1A is a plan view schematically illustrating an optical sensor module according to an embodiment of the present invention.
Figure 1B:
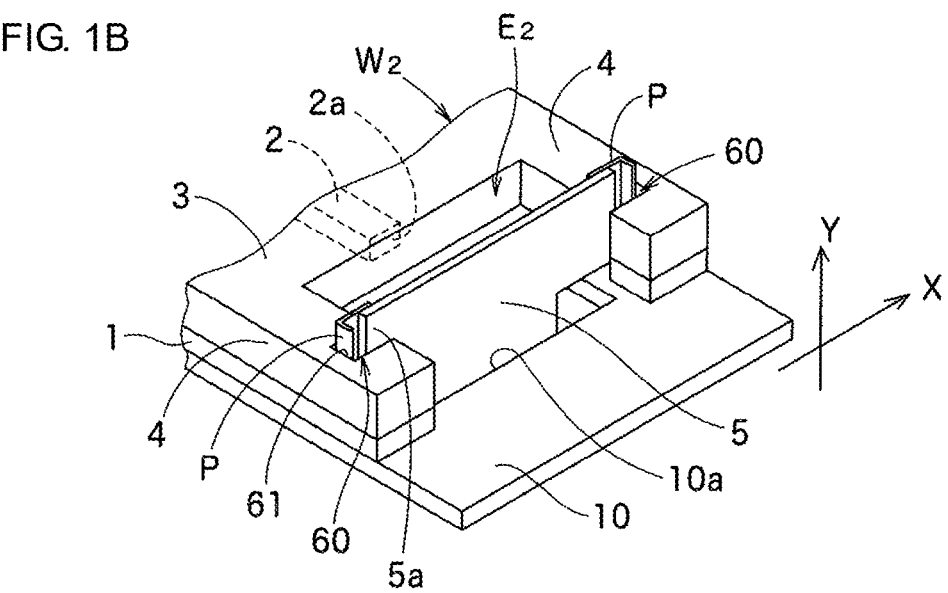
FIG. 1B is a perspective view showing a right end portion of the optical sensor module of FIG. 1A as seen from an upper right side.

FIG. 1A is a plan view schematically illustrating an optical sensor module according to an embodiment of the present invention, and FIG. 1B is a perspective view showing a right end portion of the optical sensor module as seen from an upper right side. The optical sensor module includes a board unit $E_2$ including plate-shaped projections P provided on engagement plate portions (to-be-engaged portions) $5a$ on left and right side portions of a shaped substrate 5 (laterally opposite side portions of the shaped substrate 5) thereof as protruding laterally. These projections P are less rigid than the shaped substrate 5 and, therefore, easily deformable. The board unit $E_2$ including the projections P provided on the left and right side portions of the shaped substrate 5 has an overall length Lc (see FIG. 3A) that is set slightly greater than a distance Ls between bottoms 61 of opposed vertical grooves 60 (see FIG. 2A) (Ls<Lc) in consideration of the tolerances of the components. The shaped substrate 5 of the board unit $E_2$ has an overall length Lm (see FIG. 3A) that is set slightly smaller than the distance Ls (Lm<Ls).

With the board unit $E_2$ in engagement with the optical waveguide unit $W_2$, the projections P of the board unit $E_2$ respectively abut against the bottoms 61 of the vertical grooves 60 as shown in FIG. 1A, and distal edge portions of the projections P are bent to be deformed by the abutment. With frictional resistances between the deformed portions and the bottoms 61 of the vertical grooves 60, the board unit $E_2$ is properly engaged with the optical waveguide unit $W_2$ without wobbling and warpage. That is, the tolerances of the components are accommodated by the deformation of the projections P. The deformation of the projections P depends on the material for the projections P and the thickness of each of the projections P. The projections P may be resiliently deformable or plastically deformable. However, the resilient deformation is preferred for improving the effect of preventing the disengagement of the board unit $E_2$, because the resilient deformation absorbs vibrations of the board unit $E_2$ and increases the frictional force between the projections P and the bottoms 61 of the vertical grooves 60. The board unit $E_2$ includes the laterally protruding projections P, and the tolerances of the components are accommodated by the deformation of the projections P for alignment in the optical sensor module.

Figure 2A:
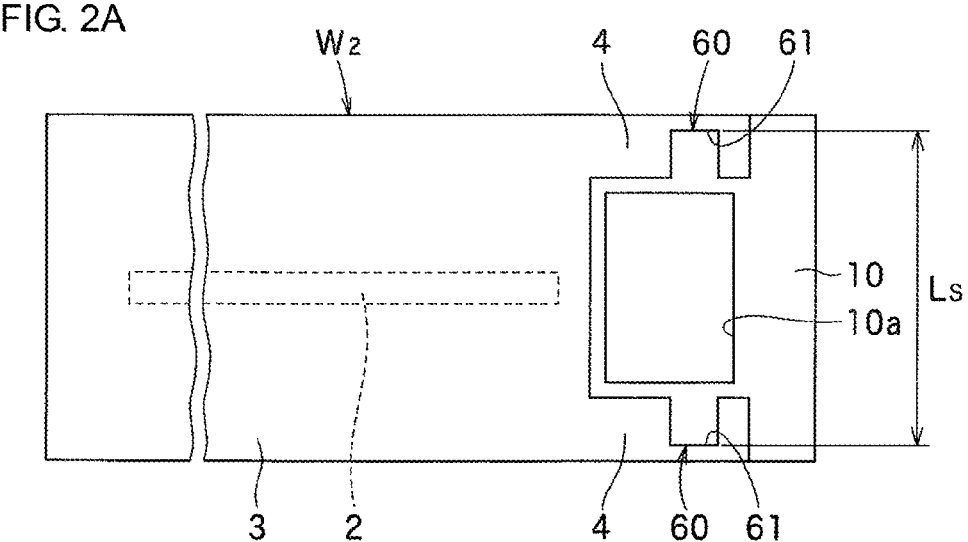
FIG. 2A is a plan view schematically illustrating an optical waveguide unit of the optical sensor module.
Figure 2B:
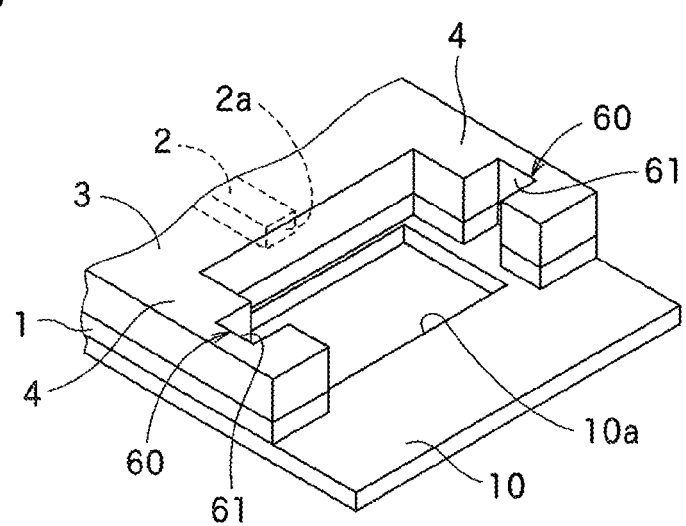
FIG. 2B is a perspective view showing a right end portion of the optical waveguide unit of FIG. 2A as seen from an upper right side.
Figure 14A:
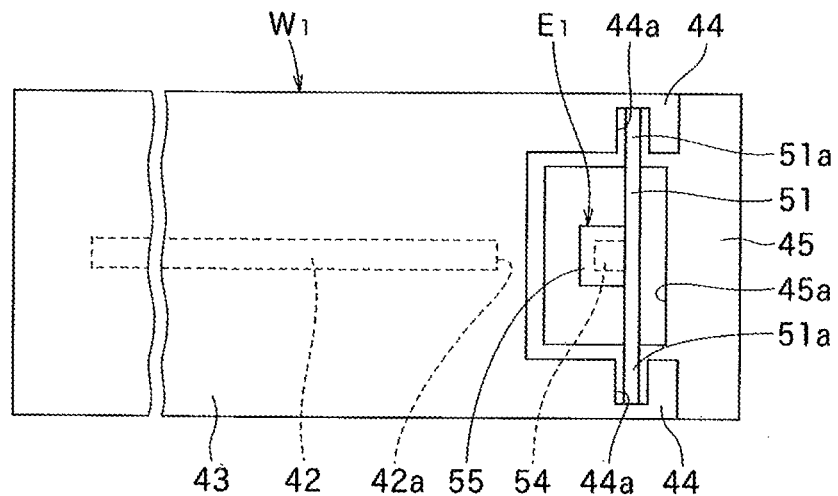
FIG. 14A is a plan view schematically illustrating an optical sensor module.
Figure 14B:
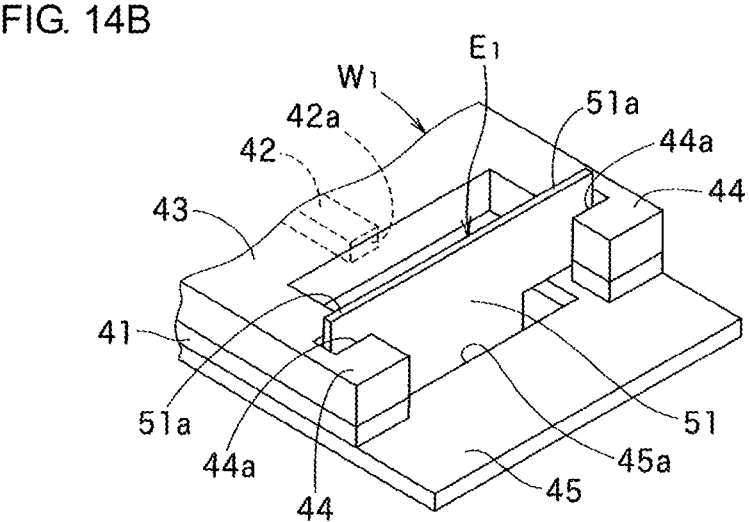
FIG. 14B is a perspective view illustrating a right end portion of the optical sensor module as seen from an upper right side.
Figure 15A:
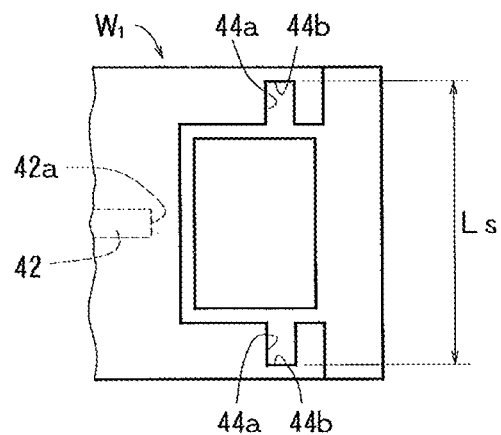
FIGS. 15A to 15D are diagrams for explaining problems associated with the optical sensor module.
Figure 15B:
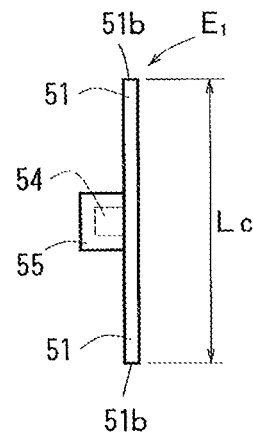
Figure 15C:
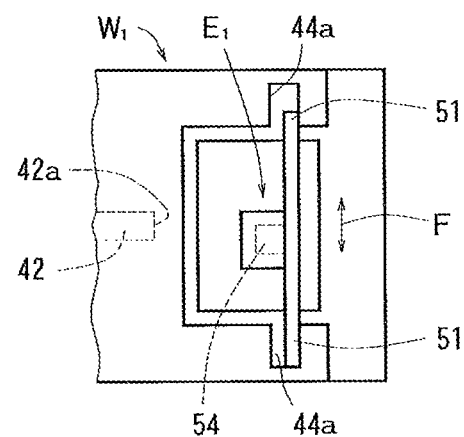
Figure 15D:
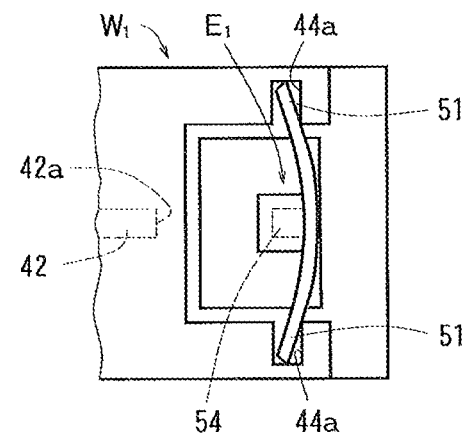

In this embodiment, more specifically, the optical waveguide unit $W_2$ has the same construction as the optical waveguide unit $W_1$ of the optical sensor module shown in FIGS. 14A and 14B. More specifically, as shown in FIGS. 2A and 2B, the optical waveguide unit $W_2$ is bonded onto a surface of the base 10 with an adhesive, and includes an under-cladding layer 1 bonded to the surface of the base 10, a core 2 formed in a predetermined linear pattern on a surface of the under-cladding layer 1 and serving as an optical path, and an over-cladding layer 3 provided over the core 2 on the surface of the under-cladding layer 1. In one end portion of the optical waveguide unit $W_2$ (on the right side in FIG. 2A), extension portions 4 (upper and lower portions in FIG. 2A) of a stack of the under-cladding layer 1 and the over-cladding layer 3 in which the core 2 is absent extend axially. The vertical grooves 60 are provided in a pair in the extension portions 4, respectively, as extending thicknesswise through the extension portions 4. The vertical grooves 60 each have a generally U-shaped horizontal cross section (having a planar bottom 61 and opposite side walls perpendicular to the bottom 61 to define the generally U-shape), and are designed so as to be located in proper positions with respect to a light transmission face $2a$ of the core 2.

In the board unit $E_2$, as described above, the projections P protrude from the lateral sides of the respective engagement plate portions $5a$, and the overall length Lc of the board unit $E_2$ (see FIG. 3A) is set slightly greater than the distance Ls between the bottoms 61 of the opposed vertical grooves 60 (see FIG. 2A) (Ls<Lc). Further, the overall length Lm (see FIG. 3A) of the shaped substrate 5 is set slightly smaller than the distance Ls (see. FIG. 2A) (Lm<Ls). The projections P respectively protrude from the lateral side edges of the engagement plate portions $5a$ with protruding amount (protruding length) of, for example, 0.005 to 0.1 mm. The projections P each have a thickness of, for example, 0.005 to 0.02 mm.

Figure 3A:
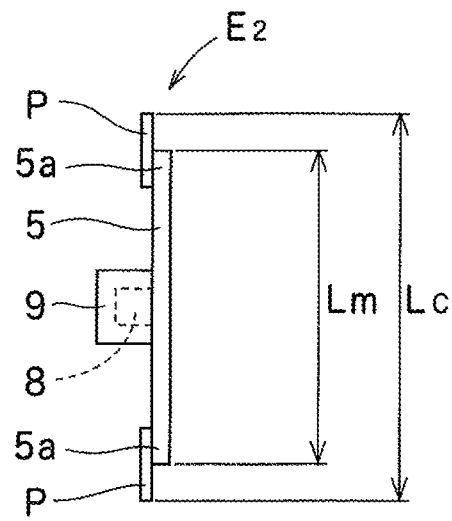
FIG. 3A is a plan view schematically illustrating aboard unit of the optical sensor module.
Figure 3B:
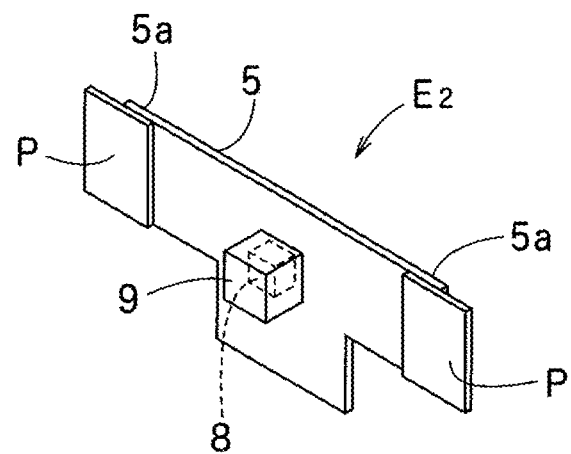
FIG. 3B is a perspective view showing a left side portion of the board unit as seen from an upper left side.

The board unit $E_2$ will be described. As shown in FIGS. 3A and 3B, the board unit $E_2$ includes the shaped substrate 5, an optical element 8 mounted on a surface of the shaped substrate 5 via an insulation layer (not shown) and an optical element mounting pad (not shown), and a sealing resin 9 which seals the optical element 8. The shaped substrate 5 includes the engagement plate portions $5a$ protruding laterally (protruding leftward and rightward in FIG. 3B) for fitting engagement with the vertical grooves 60 (see FIGS. 2A and 2B). The insulation layer is provided on a predetermined portion of the surface of the shaped substrate 5. The optical element mounting pad is provided on a center portion of a surface of the insulation layer. The optical element 8 is mounted on the optical element mounting pad. The shaped substrate 5 is formed as having the engagement plate portions $5a$ by etching, and the engagement plate portions $5a$ are shaped so as to be properly positioned with respect to the optical element mounting pad. Thus, the engagement plate portions $5a$ are provided in proper positions with respect to the optical element 8 mounted on the optical element mounting pad. The optical element 8 includes a light emitting portion or a light receiving portion, which is provided on a surface of the optical element 8. An electric circuit (not shown) is provided on the surface of the insulation layer and connected to the optical element mounting pad.

As shown in FIGS. 1A and 1B, the optical sensor module is configured such that the board unit $E_2$ is coupled to the optical waveguide unit $W_2$ with the engagement plate portions $5a$ and the projections P of the board unit $E_2$ in fitting engagement with the respective vertical grooves 60 of the optical waveguide unit $W_2$. For the fitting engagement (see FIG. 4), the board unit $E_2$ is first slightly slanted, and then one of the engagement plate portions $5a$ and a corresponding one of the projections P are slightly fitted in a corresponding one of the vertical grooves 60. Thereafter, the once slanted board unit $E_2$ is returned to its original position, and the other engagement plate portion $5a$ and the other projection P are slightly fitted in the other vertical groove 60. In this state, the board unit $E_2$ is entirely pushed into a fully engaged state. In this engaged state, as described above, the projections P of the board unit $E_2$ are deformed in abutment against the bottoms 61 of the vertical grooves 60 to accommodate the tolerances of the components. The deformed projections P are kept in abutment against the bottoms 61 of the vertical grooves 60, so that the board unit $E_2$ free from wobbling and warpage.

The vertical grooves 60 of the optical waveguide unit $W_2$ are designed so as to be located in the proper positions with respect to the light transmission face $2a$ of the core 2. The engagement plate portions $5a$ of the board unit $E_2$ are designed so as to be located in the proper positions with respect to the optical element 8. With the engagement plate portions $5a$ in fitting engagement with the vertical grooves 60, therefore, the light transmission face $2a$ of the core 2 and the optical element 8 are properly positioned to be self-aligned with each other. In the engaged state, the projections P are deformed to be positioned with respect to the bottoms 61 of the vertical grooves 60, respectively, whereby the optical element 8 is properly positioned relative to the base 10 laterally (in an X-axis direction) as seen in FIG. 1B. In the engaged state, lower edges of the laterally protruding engagement plate portions 5a abut against the surface of the base 10. The abutment permits proper positioning of the optical element 8 with respect to a direction perpendicular to the surface of the base 10 (in a Y-axis direction).

In this case, the projections P are designed so that the deformation width of the one projection P is generally equal to that of the other projection P. Therefore, no error occurs due to a difference in deformation width between the left and right projections P. In order to eliminate the difference in deformation width between the left and right projections P, for example, guide grooves (perforation lines, half-cut lines or the like) along which the projections P are to be deformed may be formed in generally symmetrical positions on the projections P. Further, the protruding amounts of the projections P may be reduced for reduction of the deformable areas, thereby eliminating the difference in deformation width. Where the projections P each have a smaller protruding amount, the protruding amount is preferably in the range of 0.005 to 0.02 mm.

In this embodiment, as shown in FIGS. 1A and 1B, the base 10 has a rectangular through-hole 10a in association with the board unit $E_2$, and a part of the board unit $E_2$ projects from a back surface of the base 10. The projecting part of the board unit $E_2$ is connected, for example, to a mother board (not shown) provided on the rear side of the base 10 for transmission of signals to the optical element.

The optical sensor module is produced through the following steps (1) to (3):
(1) producing the optical waveguide unit $W_2$ (see FIGS. 5A to 5C and FIGS. 6A to 6D);
(2) producing the board unit $E_2$ (see FIGS. 7A to 7C and FIGS. 8A and 8B); and
(3) combining the board unit $E_2$ with the optical waveguide unit $W_2$.

The step (1) of producing the optical waveguide unit $W_2$ will be described. First, a planar substrate 20 (see FIG. 5A) to be used for formation of the under-cladding layer 1 is prepared. Exemplary materials for the substrate 20 include glass, quartz, silicon, resins and metals. Particularly, a stainless steel substrate is preferred. The stainless steel substrate is excellent in thermal expansion/contraction resistance, so that dimensions of various components of the optical waveguide unit can be substantially maintained as designed during the production of the optical waveguide unit. The substrate 20 has a thickness of, for example, 20 μm to 1 mm.

Figure 5A:
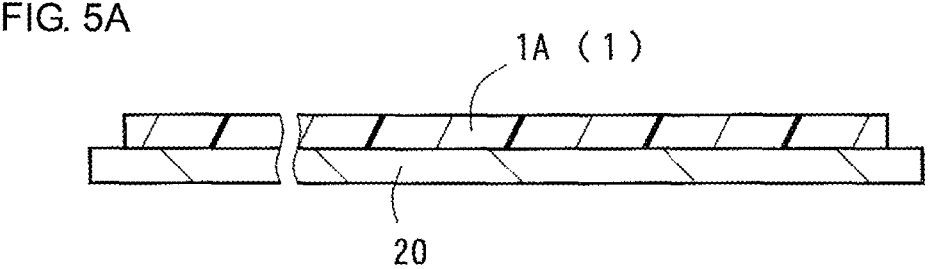
FIGS. 5A to 5C are schematic diagrams for explaining the step of forming an under-cladding layer and a core of the optical waveguide unit.

Then, as shown in FIG. 5A, a varnish prepared by dissolving a under-cladding layer formation photosensitive resin such as a photosensitive epoxy resin in a solvent is applied onto a predetermined surface area of the substrate 20. Thereafter, the applied varnish is heat-treated (at 50° C. to 120° C. for about 10 to about 30 minutes), as required, to be dried. Thus, a photosensitive resin layer 1A for formation of the under-cladding layer 1 is formed. Then, the photosensitive resin layer 1A is exposed to radiation such as ultraviolet radiation, whereby the under-cladding layer 1 is formed. The thickness of the under cladding layer 1 is typically 1 to 50 μm.

Figure 5B:
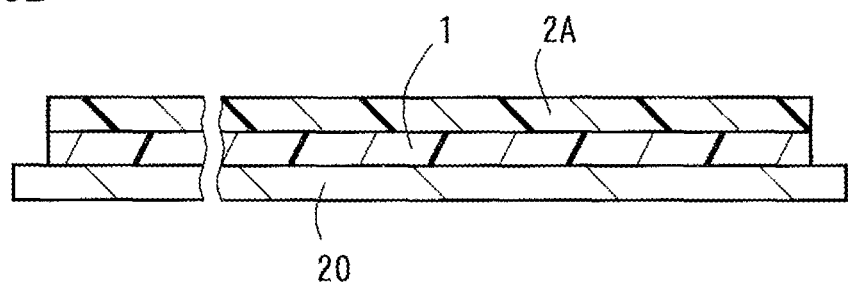
Figure 5C:
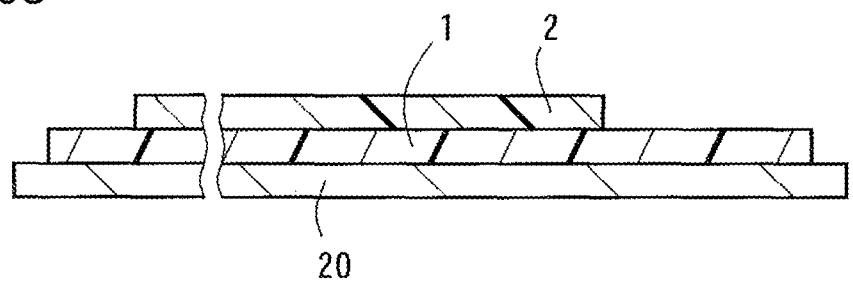

Next, as shown in FIG. 5B, a core formation photosensitive resin layer 2A is formed on a surface of the under-cladding layer 1 in substantially the same manner as the under-cladding layer formation photosensitive resin layer 1A. Then, the photosensitive resin layer 2A is exposed to radiation via a photomask formed with an opening pattern corresponding to the pattern of the core 2. In turn, the photosensitive resin layer 2A is heat-treated, and then developed with the use of a development liquid. Thus, as shown in FIG. 5E, an unexposed portion of the photosensitive resin layer 2A is dissolved away, and the remaining portion of the photosensitive resin layer 2A has the pattern of the core 2. The thickness (height) of the core 2 is typically 5 to 60 μm. The width of the core 2 is typically 5 to 60 μm.

A photosensitive resin similar to that used for the under-cladding layer 1, for example, is used as a material for the core 2. The core material has a higher refractive index than the material for the under-cladding layer 1 and a material for the over-cladding layer 3 (see FIG. 6C). The refractive index may be adjusted, for example, by selection of the types of the materials for the under-cladding layer 1, the core 2 and the over-cladding layer 3 and adjustment of the composition ratio of the materials.

Next, a molding die 30 (see FIG. 6A) is prepared. The molding die 30 is used for simultaneously forming the over-cladding layer 3 (see FIG. 6C) and the over-cladding layer extension portions 4 having the board unit engaging vertical grooves 60 (see FIG. 6(c)) by die molding. The molding die 30 has a recess 31 provided in a lower surface thereof and having a die surface complementary in shape to the over-cladding layer 3 as seen in perspective from a lower side in FIG. 6A. The recess 31 includes portions 31a for formation of the extension portions 4, and a portion 31b for formation of a lens portion 3b (see FIG. 6c). The extension formation portions 31a each have a ridge 32 for formation of parts of the board unit engaging vertical grooves 60 in the over-cladding layer 3. The molding die 30 has alignment marks (not shown) formed on an upper surface thereof for proper positioning thereof in alignment with the light transmission face 2a (a right end face in FIG. 63) of the core 2 when being used. The recess 31 and the ridges 32 are provided in proper positions with respect to the alignment marks.

The molding die 30 is set with the alignment marks thereof in alignment with the light transmission face 2a. In this state, the over-cladding layer 3 and the board unit engaging vertical grooves 60 are simultaneously formed in the proper positions with respect to the light transmission face 2a of the core 2 by molding. When the molding die 30 is set, the lower surface of the molding die 30 is brought into intimate contact with the surface of the under-cladding layer 1, whereby a space defined by the die surface of the recess 31, the surface of the under-cladding layer 1 and the surface of the core 2 serves as a mold cavity 33. Further, the molding die 30 has an inlet (not shown) communicating with the recess 31 for injecting an over-cladding layer formation resin therethrough into the mold cavity 33.

A photosensitive resin similar to that used for the under-cladding layer 1, for example, is used as the over-cladding layer formation resin. In this case, the photosensitive resin filled in the mold cavity 33 should be exposed to radiation such as ultraviolet radiation and, therefore, the molding die 30 is made of a material (e.g., quartz) transmissive to the radiation. Alternatively, a thermosetting resin may be used as the over-cladding layer formation resin. In this case, the molding die 30 does not have to be transparent. For example, the molding die 30 may be made of a metal or quartz.

Figure 6A:
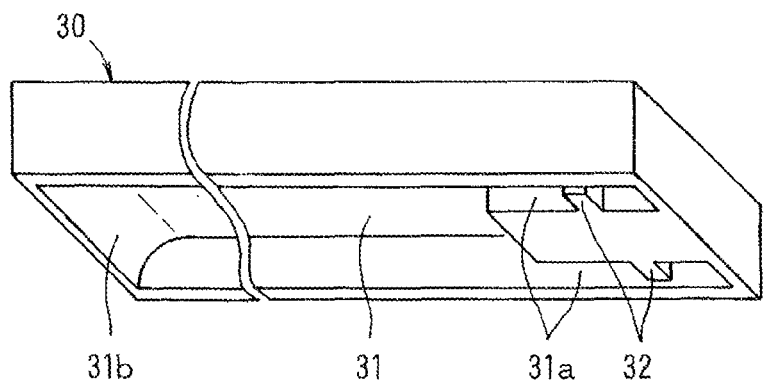
FIG. 6A is a perspective view schematically illustrating a molding die to be used for the formation of the over-cladding layer of the optical waveguide unit.
Figure 6B:
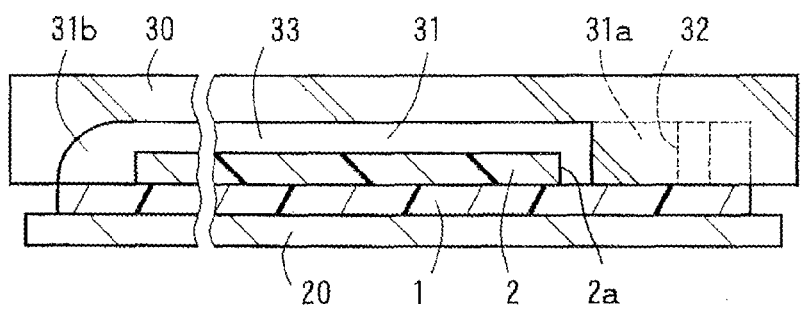
FIGS. 6B to 6D are schematic diagrams for explaining the step of forming the over-cladding layer.

Then, as shown in FIG. 6B, the entire molding die 30 is properly positioned with the alignment marks thereof in alignment with the light transmission face 2a of the core 2 and, in this state, the lower surface of the molding die 30 is brought into intimate contact with the surface of the under-cladding layer 1. Then, the over-cladding layer formation resin is injected through the inlet of the molding die 30 into the mold cavity 33 defined by the die surfaces of the recess 31 and the ridges 32, the surface of the under-cladding layer 1 and the surface of the core 2 to fill the mold cavity 33. Where the resin is the photosensitive resin, the resin is exposed to radiation such as ultraviolet radiation through the molding die 30 and then heat-treated. Where the resin is the thermosetting resin, the resin is heat-treated. Thus, the over-cladding layer formation resin is cured to simultaneously form the over-cladding layer 3 and the board unit engaging vertical grooves 60 (the extension portions 4 of the over-cladding layer 3). Where the under-cladding layer 1 and the over-cladding layer 3 are made of the same material, the under-cladding layer 1 and the over-cladding layer 3 are merged together at contact portions thereof.

Figure 6C:
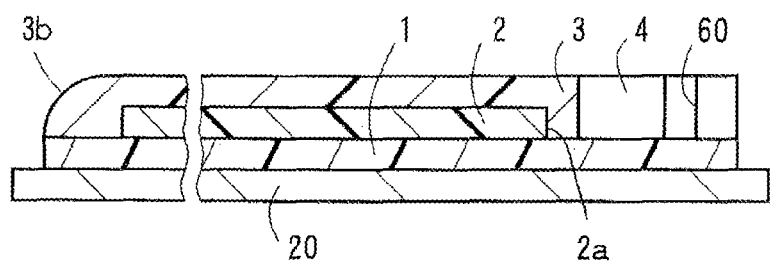

Then, the molding die is removed. Thus, the over-cladding layer 3 and the parts of the board unit engaging vertical grooves 60 for the over-cladding layer 3 are provided as shown in FIG. 6C. As described above, the parts of the board unit engaging vertical grooves 60 are formed with respect to the light transmission face 2a of the core 2 by using the molding die 30 and, therefore, properly positioned with respect to the light transmission face 2a of the core 2. Further, the lens portion 3b of the over-cladding layer 3 is also properly positioned.

The thickness of the over-cladding layer 3 is typically greater than the thickness of the core 2 and not greater than 1200 μm (as measured from the surface of the under-cladding, layer 1). The board unit engaging vertical grooves 60 are dimensioned so as to conform to the dimensions of the engagement plate portions 5a and the projections P of the board unit $E_2$ to be brought into fitting engagement with the vertical grooves 60. For example, the vertical grooves 60 each have a depth of 0.2 to 1.2 mm, and a width of 0.2 to 2.0 mm.

Figure 6D:
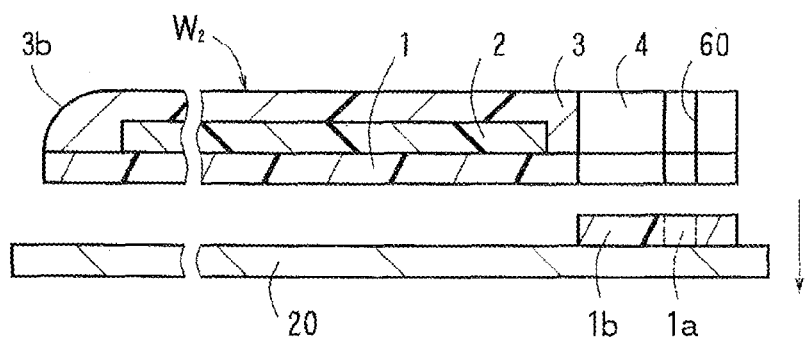

Then, as shown in FIG. 6D, the substrate 20 is removed from a back surface of the under-cladding layer 1 (see an arrow in FIG. 6D). At this time, parts 1b of the under-cladding layer 1 on which the over-cladding layer 3 is absent, e.g., parts 1a of the under-cladding layer 1 associated with the vertical grooves 60 of the over-cladding layer 3, have no adhesion to the over-cladding layer 3 and, therefore, are generally kept adhering to the substrate 20 to be removed (together with the substrate 20). The other part of the under-cladding layer 1 is kept adhering to the over-cladding layer 3, so that separation occurs between the back surface of the under-cladding layer 1 and the substrate 20. At this time, the parts 1a of the under-cladding layer 1 associated with the vertical grooves 60 are separated to be removed together with the substrate 20. Thus, the board unit engaging vertical grooves 60 are formed as extending thicknesswise through the under-cladding layer 1 and the over-cladding layer 3. In this manner, the step (1) of producing the optical waveguide unit $W_2$ is completed to provide the optical waveguide unit $W_2$, which includes the under-cladding layer 1, the core 2 and the over-cladding layer 3 and is formed with the board unit engaging vertical grooves 60.

Then, as shown in FIGS. 2A and 2B, the optical waveguide unit $W_2$ is bonded onto a base 10 such as an acryl plate with an adhesive. At this time, the under-cladding layer 1 adheres to the base 10. A plate having no irregularities on its surface is used as the base 10. The base 10 may be of any material, and may have any degree of transparency and any thickness. Other examples of the plate include a polypropylene (PP) plate, a metal plate and a ceramic plate. The thickness of the base 10 is, for example, 500 μm to 5 mm.

Next, the step (2) of producing the board unit $E_2$ will be described. First, a substrate 5A (see FIG. 7A) serving as a base material for the shaped substrate 5 is prepared. Exemplary materials for the substrate 5A include metals and resins. In particular, a stainless steel substrate is preferred from the viewpoint of easy processability and dimensional stability. The thickness of the substrate 5A is, for example, 0.02 to 0.1 mm.

Figure 7A:
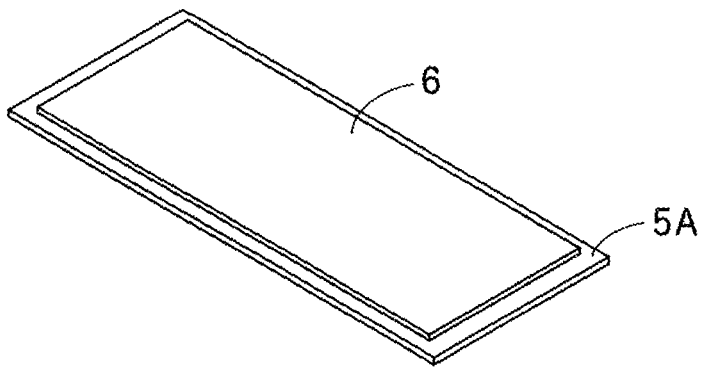
FIGS. 7A to 7C are schematic diagrams for explaining steps of a board unit producing process.

Then, as shown in FIG. 7A, a varnish prepared by dissolving an insulation layer formation photosensitive resin such as a photosensitive polyimide resin in a solvent is applied onto a predetermined surface area of the substrate 5A. Thereafter, the applied varnish is heat-treated, as required, to be dried. Thus, a photosensitive resin layer for formation of the insulation layer is formed. Then, the photosensitive resin layer is exposed to radiation such as ultraviolet radiation via a photomask, whereby the insulation layer 6 is formed in a predetermined pattern. The thickness of the insulation layer 6 is typically 5 to 15 μm.

Figure 7B:
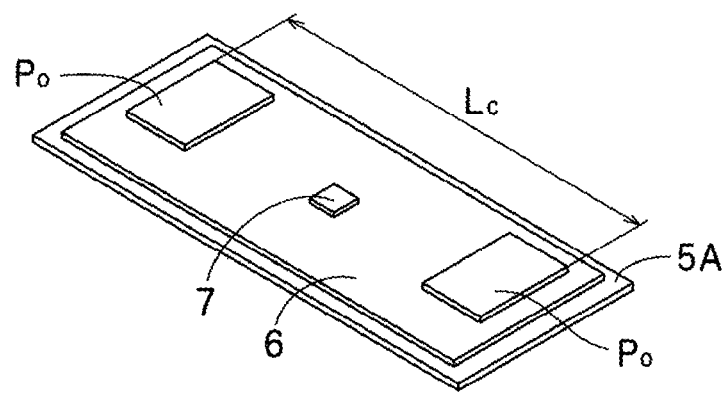

Next, as shown in FIG. 7B, the optical element mounting pad 7, the electric circuit (not shown) connected to the optical element mounting pad 7, and sheet layers $P_0$ later serving as the projections P (see FIG. 8A) are formed from the same material (typically, a metal material for the electric circuit) on a surface of the insulation layer 6. The formation of these components is achieved, for example, in the following manner. First, a metal layer (having a thickness of about 60 to about 260 nm) is formed on the surface of the insulation layer 6 by sputtering, electroless plating or the like. The metal layer later serves as a seed layer (a layer serving as a base for formation of an electrolytic plating layer) in a subsequent electrolytic plating process. In turn, dry resist films are respectively affixed to opposite surfaces of a stack including the substrate 5A, the insulation layer 6 and the seed layer. Thereafter, openings of a pattern for the mounting pad 7, the electric wirings and the sheet layers $P_0$ for the formation of the projections are simultaneously formed in one of the dry resist films formed on the seed layer by a photolithography process to uncover surface portions of the seed layer on bottoms of the openings. Then, electrolytic plating layers (each having a thickness of about 5 to about 20 μm) are formed on the uncovered surface portions of the seed layer on the bottoms of the openings by electrolytic plating. Then, the dry resist films are removed with the use of an aqueous sodium hydroxide solution or the like. Thereafter, a portion of the seed layer not formed with the electrolytic plating layer was removed by soft etching. Thus, stack portions each including a remaining electrolytic plating layer portion and an underlying seed layer portion respectively serve as the mounting pad 7, the electric, wirings and the projection formation sheet layers $P_0$. The projection formation sheet layers $P_0$ are thus formed simultaneously with the mounting pad 7 by the photolithography process using a single photomask and, therefore, are accurately positioned with respect to the mounting pad 7 and properly shaped. In this step, a distance between outer edges of the respective projection formation sheet layers. $P_0$ (equivalent to the overall length Lc of the board unit $E_2$) is set greater than the distance Ls (see FIG. 2A) between the bottoms 61 of the vertical grooves 60 of the optical waveguide unit $W_2$.

Figure 7C:
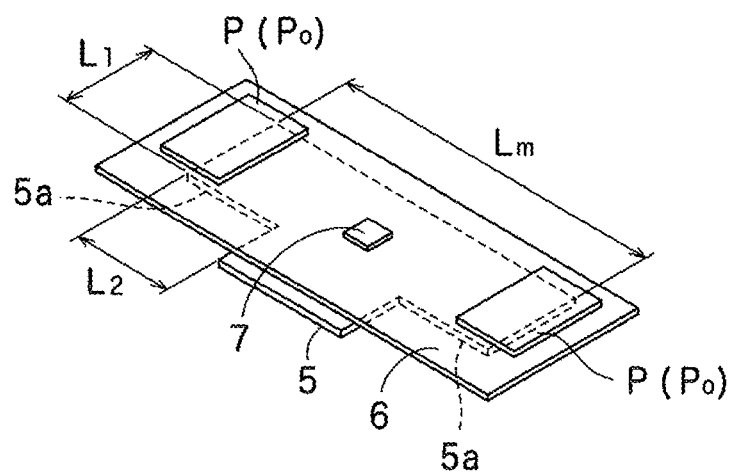

Then, as shown in FIG. 7C, the substrate 5A is shaped to form the shaped substrate 5 including the engagement plate portions 5a disposed in the proper positions with respect to the mounting pad 7. At this time, the shaped-substrate 5 has an overall length Lm that is smaller than the distance Ls between the bottoms 61 of the vertical grooves 60 of the optical waveguide unit $W_2$. The formation of the shaped substrate 5 is achieved, for example, in the following manner. First, the back surface of the substrate 5A is covered with a dry resist film. The dry resist film is patterned by a photolithography process to be partly left as having an intended shape such that the engagement plate portions 5a are provided in the proper positions with respect to the mounting pad 7. Then, portions of the substrate 5A uncovered with the remaining dry resist film portion are etched away with the use of an aqueous ferric chloride solution. Thus, the shaped substrate 5 having the engagement plate portions 5a is formed from the substrate 5A. In turn, the remaining dry resist film portion is removed with the use of an aqueous sodium hydroxide solution or the like. The insulation layer 6 partly protrudes from the shaped substrate 5 thus formed from the substrate 5A. Further, side edge portions of the projection formation sheet layers $P_0$ also protrude from side edges of the engagement plate portions 5a, and the projections P are formed from the projection formation sheet layers $P_0$. The engagement plate portions 5a of the shaped substrate 5 each have, for example, a vertical dimension $L_1$ of 0.5 to 5.0 mm, and a horizontal dimension $L_2$ of 0.5 to 5.0 mm.

Figure 8A:
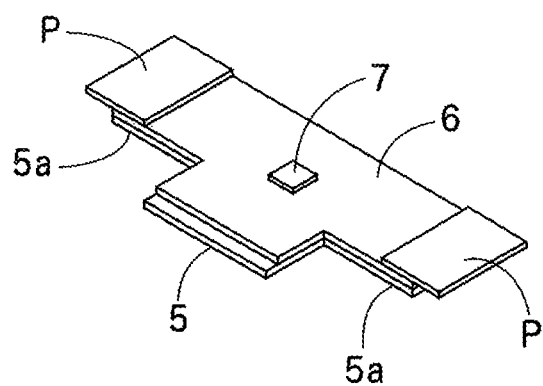
FIGS. 8A and 8B are schematic diagrams for explaining steps of the board unit producing process subsequent to the steps shown in FIGS. 7A to 7C.

Then, as shown in FIG. 8A, a protruding unnecessary portion of the insulation layer 6 is etched away. The etching is carried out, for example, in the following manner. First, a back surface of the shaped substrate 5 and a back surface of a portion of the insulating layer 6 protruding from the shaped substrate 5 are covered with a dry resist film. The dry resist film is patterned by a photolithography process to be partly left as uncovering the unnecessary portion of the insulation layer 6 to be removed. Then, the portion of the insulation layer 6 uncovered with the remaining dry resist film portion is etched away with the use of a polyimide etching liquid. In turn, the dry resist film is removed with the use of an aqueous sodium hydroxide solution or the like.

Figure 8B:
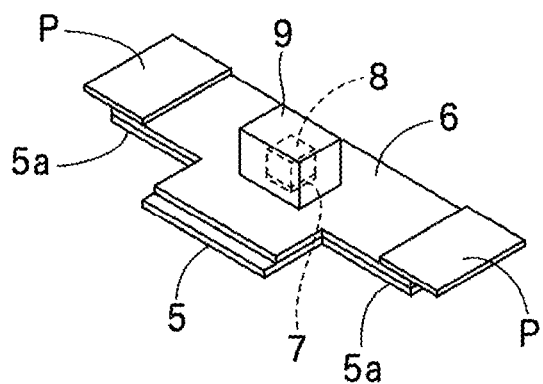

After the optical element 8 is mounted on the mounting pad 7, as shown in FIG. 8B, the optical element 8 and its peripheral portion are sealed with a transparent resin by potting. A mounting machine is used for the mounting of the optical element 8. The optical element 8 is accurately positioned on the mounting pad 7 by means of a positioning device such as a positioning camera provided in the mounting machine. Thus, the step (2) of producing the board unit $E_2$ is completed to provide the board unit $E_2$, which includes the shaped substrate 5 having the engagement plate portions 5a, the insulation layer 6, the mounting pad 7, the projections P, the optical element 8 and the sealing resin 9. In the board unit $E_2$, as described above, the engagement plate portions 5a are formed with respect to the mounting pad 7, so that the optical element 8 mounted on the mounting pad 7 is disposed in proper positional relation to the engagement plate portions 5a.

Figure 4:
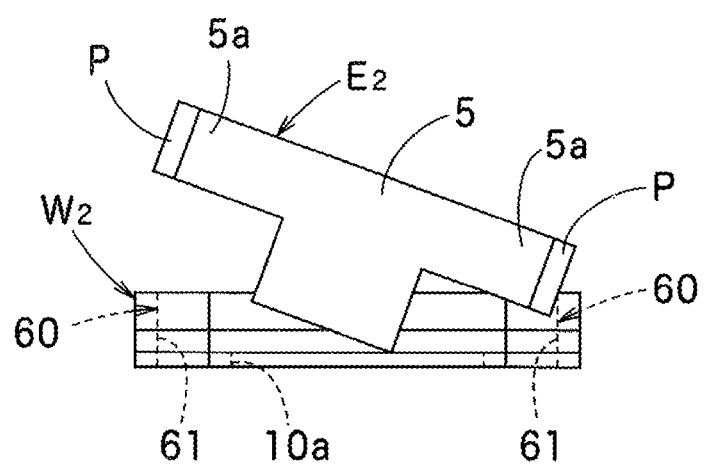
FIG. 4 is a schematic side view showing how to bring the board unit into engagement with the optical waveguide unit.

Next, the step (3) of combining the optical waveguide unit $W_2$ and the board unit $E_2$ together will be described. With a surface (the light emitting portion or the light receiving portion) of the optical element 8 (see FIGS. 3A and 3B) of the board unit $E_2$ facing toward the light transmission face 2a of the core 2 (see FIGS. 2A and 2B) of the optical waveguide unit $W_2$, as shown in FIG. 4, the board unit $E_2$ is first slightly slanted, and then one of the engagement plate portions 5a and a corresponding one of the projections P are slightly fitted in a corresponding one of the board unit engaging vertical grooves 60. In turn, the once slanted board unit $E_2$ is returned to its original position, and the other engagement plate portion 5a and the other projection P are slightly fitted in the other vertical groove 60. In this state, the board unit $E_2$ is entirely pushed into the optical waveguide unit $W_2$. Thus, the optical waveguide unit $W_2$ and the board unit $E_2$ are combined together (see FIGS. 1A and 1B). At this time, the projections P of the board unit $E_2$ are deformed in abutment against the bottoms 61 of the vertical grooves 60. In this state, the projections P are kept in abutment against the bottoms 61 of the vertical grooves 60. The deformation of the projections P accommodates the tolerances of the components, so that the board unit $E_2$ is free from wobbling and warpage. The engagement plate portions 5a and the projections P in fitting engagement with the vertical grooves 60 may be fixed in the vertical grooves 60 with an adhesive. Thus, the intended optical sensor module is completed.

Figure 9A:
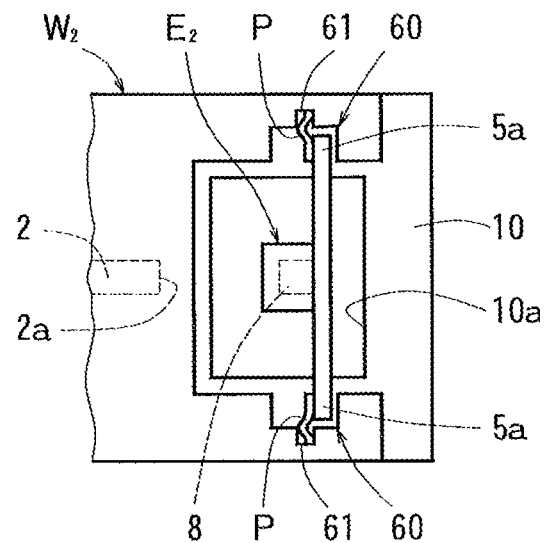
FIGS. 9A and 9B are plan view schematically illustrating variations of vertical grooves of the optical waveguide unit.
Figure 9B:
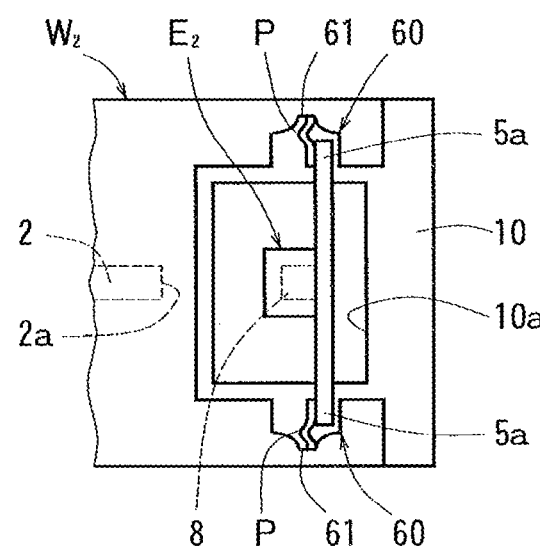

FIGS. 9A and 9B are plan views schematically illustrating variations of the vertical grooves 60 to be formed in the optical waveguide unit $W_2$. In these variations, the bottoms 61 of the vertical grooves 60 each have a width that is not greater than twice the thickness of the engagement plate portion 5a. Thus, the optical waveguide unit $W_2$ is designed so as to minimize or eliminate a difference in deformation width between the left and right projections P. That is, in FIG. 9A, the bottoms 61 are each stepped to have a width reduced stepwise. In FIG. 9B, the bottoms 61 are each arcuately inclined to have a gradually reduced width. The other components are the same as those of the embodiment shown in FIGS. 1A and 1B. The width of each of the bottoms 61 of the vertical grooves 60 shown in FIGS. 1A and 1B may be reduced by reducing the overall width of the vertical grooves 60. According to these variations, the reduction in the width of each of the bottoms 61 of the vertical grooves 60 stabilizes the fitting engagement of the board unit $E_2$, thereby more reliably preventing the wobbling and the warpage of the board unit $E_2$.

In the embodiment described above, the projections P of the board unit $E_2$, and the mounting pad 7 and the electric wirings of the board unit $E_2$ are simultaneously formed from the same material, but the projections P may be separately formed. For example, sheet pieces for the projections P may be bonded to the side edge portions of the engagement plate portions 5a with an adhesive after the optical element 8 is sealed with the resin. A material for the sheet pieces may be the same metal material as for the mounting pad 7 and the electric wirings, or may be a material different from this material. Exemplary materials include synthetic resins and rubbers.

Figure 10:
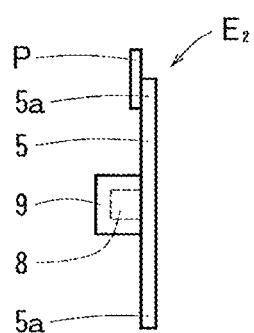
FIG. 10 is a plan view schematically illustrating a variation of the board unit.

In the embodiment described above, the projections P of the board unit $E_2$ are provided on the opposite side edges of the board unit $E_2$. Alternatively, as shown in FIG. 10, only one projection P may be provided on one side edge of the board unit $E_2$.

Figure 11A:
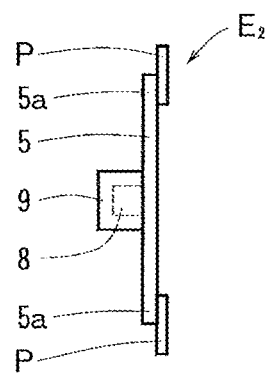
FIGS. 11A and 11B are plan views schematically illustrating other variations of the board unit.
Figure 11B:
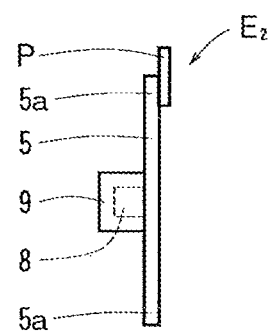

In the embodiment described above, the projections P of the board unit $E_2$, and the mounting pad 7 and the electric wirings of the board unit $E_2$ are provided on the same surface. Alternatively, as shown in FIGS. 11A and 11B, the projections P may be provided by bonding sheet pieces onto a surface opposite from the surface on which the mounting pad 7 is provided. In FIG. 11A, the projections P are provided on the opposite side edges of the board unit $E_2$. In FIG. 11B, only one projection P is provided on one side edge of the board unit $E_2$.

Figure 12:
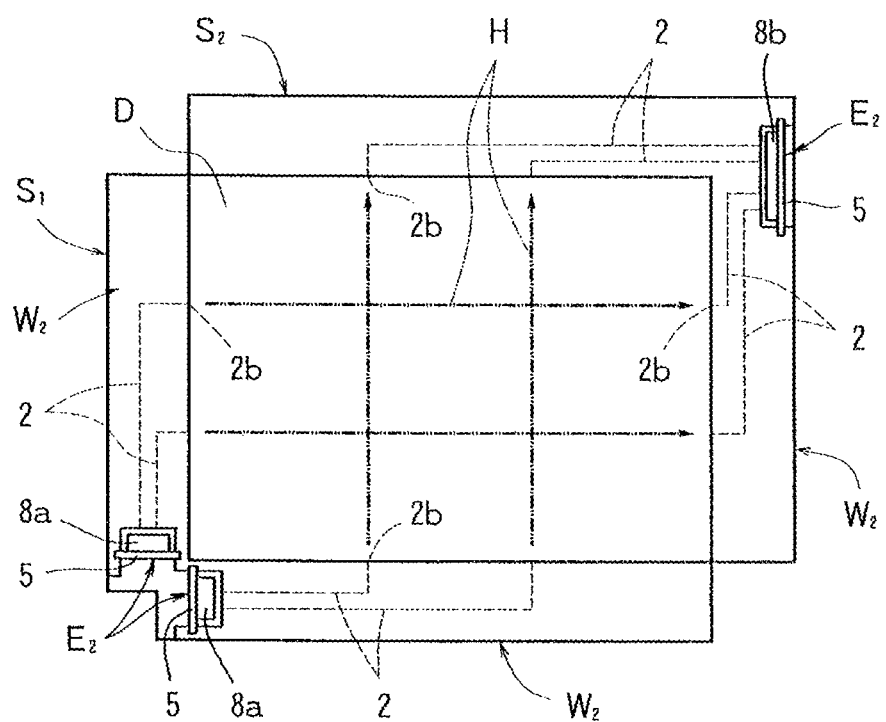
FIG. 12 is a plan view schematically illustrating detection means for a touch panel employing the optical sensor module.
Figure 13A:
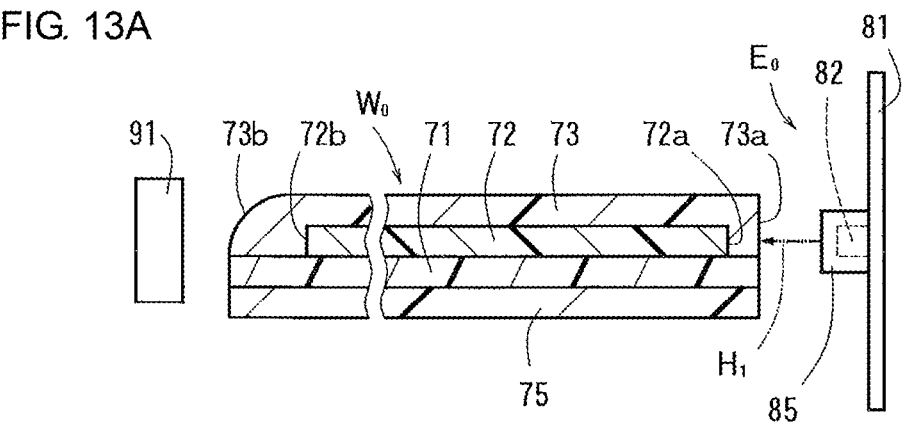
FIGS. 13A and 13B are schematic diagrams for explaining an alignment method for a conventional optical sensor module.
Figure 13B:
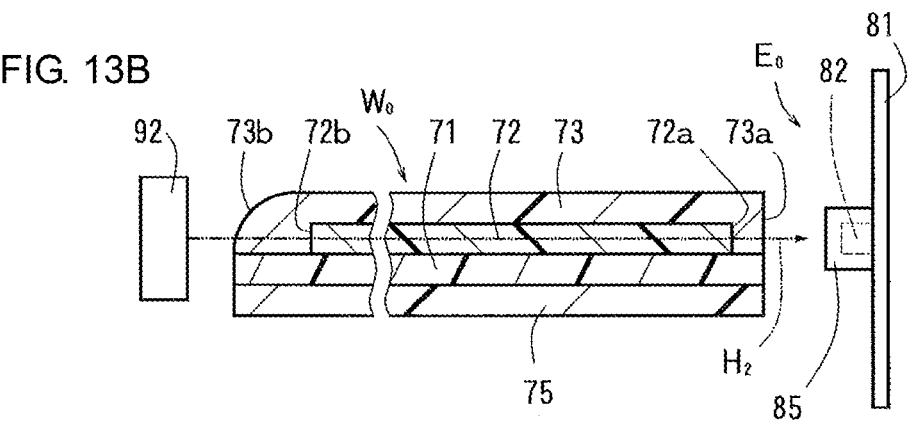

As shown in FIG. 12, the inventive optical sensor module may be embodied in the form of two L-shaped optical sensor modules $S_1$, $S_2$, which are arranged in a rectangular frame shape for use as finger touch position detecting means for a touch panel. In one L-shaped optical sensor module $S_1$, more specifically, two board units $E_2$ each mounted with light emitting elements 8a are respectively engaged with two optical waveguide units $W_2$ at a corner, and end faces 2b of cores 2 from which light beams H are emitted and a lens surface of an over-cladding layer 3 are directed inward of the frame. In the other L-shaped optical sensor module $S_2$, a single board unit $E_2$ mounted with light receiving elements 8b is engaged with an optical waveguide unit $W_2$ at a corner, and a lens surface of an over-cladding layer 3 on which light beams H are incident and end faces 2b of cores 2 are directed inward of the frame. The two L-shaped optical sensor modules are disposed along peripheral edges of a rectangular screen of a rectangular display D of the touch panel to surround the screen, so that the light beams H emitted from the one L-shaped optical sensor module $S_1$ can be received by the other L-shaped optical sensor module $S_2$. Thus, the emitted light beams H travel parallel to the screen of the display D in a lattice form on the screen. Therefore, when the screen of the display D is touched by a finger, some of the emitted light beams H are blocked by the finger. A finger touch position can be detected by detecting a light blocked portion by the light receiving elements 8b. In FIG. 12, the projections P of the board units $E_2$ are not shown. Further, the cores 2 are shown by broken lines, and the thicknesses of the cores 2 are indicated by the thicknesses of the broken lines. In FIG. 12, some of the cores 2 are not shown.

Next, an inventive example will be described in conjunction with a conventional example. It should be understood that the present invention be not limited to the inventive example.

EXAMPLE

Materials for Under-Cladding Layer and Over-Cladding Layer (Including Extension Portions)

An under-cladding layer material and an over-cladding layer material were prepared by mixing 35 parts by weight of bisphenoxyethanolfluorene diglycidyl ether (Component A), 40 parts by weight of 3',4'-epoxycyclohexylmethyl-3,4-epoxycyclohexane carboxylate as an alicyclic epoxy resin (CELLOXIDE 2021P manufactured by Daicel Chemical Industries, Ltd.) (Component B), 25 parts by weight of (3',4'-epoxycyclohexane)methyl-3',4'-epoxycyclohexyl 1 carboxylate (CELLOXIDE 2081 manufactured by Daicel Chemical Industries, Ltd.) (Component C), and 2 parts by weight of a 50 wt % propione carbonate solution of 4,4'-bis[di(β-hydroxyethoxy)phenylsulfinio] phenylsulfide bishexafluoroantimonate (Component D).

Material for Core

A core material was prepared by dissolving 70 parts by weight of Component A, 30 parts by weight of 1,3,3-tris{4-[2-(3-oxetanyl)]butoxyphenyl}butane and 1 part by weight of Component D in ethyl lactate.

Production of Optical Waveguide Unit

The under-cladding layer material was applied onto a surface of a stainless steel substrate with an applicator, and exposed by irradiation with ultraviolet radiation (at a wavelength of 365 nm) at 2000 mJ/cm$^2$. Thus, the under-cladding layer (having a thickness of 25 μm) was formed (see FIG. 5A).

Then, the core material was applied onto a surface of the under-cladding layer with an applicator, and then dried at 100° C. for 15 minutes to form a photosensitive resin layer (see FIG. 5B). Then, a synthetic quartz-based chromium mask (photomask) formed with an opening pattern conformal to a core pattern was placed above the photosensitive resin layer, which was in turn exposed from above by irradiation with ultraviolet radiation (at a wavelength of 365 nm) at 4000 mJ/cm$^2$ by a proximity exposure method, and then heat-treated at 80° C. for 15 minutes. Subsequently, a development process was performed by using a γ-butyrolactone aqueous solution to dissolve away an unexposed portion of the photosensitive resin layer, and a heat treatment was performed at 120° C. for 30 minutes. Thus, a core (having a thickness of 50 μm and a width of 50 μm) was formed. (see FIG. 5C).

Next, a quartz molding die (see FIG. 6A) for simultaneous molding of an over-cladding layer and board unit engaging vertical grooves (of extension portions of the over-cladding layer) was set in a proper position with respect to a light transmission face of the core (see FIG. 6B). In turn, the over-cladding layer material for formation of the over-cladding layer including the extension portions was injected into a molding cavity, and then exposed by irradiation with ultraviolet radiation at 2000 mJ/cm$^2$ through the molding die. After a heat treatment was performed at 120° C. for 15 minutes, the molding die was removed. Thus, the over-cladding layer and the board unit engaging vertical grooves were formed (see FIG. 6C). The over-cladding layer had a thickness of 1000 μm as measured (from the surface of the under-cladding layer) by a contact-type film thickness meter.

Then, the stainless steel substrate was removed from the back surface of the under-cladding layer (see FIG. 6D). At this time, parts of the under-cladding layer on which the over-cladding layer was absent, i.e., parts of the under-cladding layer associated with the vertical grooves of the over-cladding layer, were kept adhering to the stainless steel substrate to be removed (together with the stainless steel substrate). As a result, the vertical grooves were formed as extending thicknesswise through the under-cladding layer and the over-cladding layer. Then, the optical waveguide unit resulting from the removal was bonded onto an acryl plate with an adhesive (see FIGS. 2A and 2B). The vertical grooves each had a generally U-shaped cross section. Further, a distance (Ls) between bottoms of the opposed vertical grooves was 14.00 mm.

Production of Board Unit

An insulation layer (having a thickness of 10 μm) was formed from a photosensitive polyimide resin on a surface portion of a stainless steel substrate (25 mm×30 mm×50 μm (thick)) (see FIG. 7A). Then, a stack of a copper/nickel/chromium alloy seed layer and a copper electrolytic plating layer (having a thickness of 10 μm) was formed on a surface of the insulation layer by a semi-additive process. Further, a gold/nickel plating process was performed on a surface of the stack (to gold/nickel thicknesses of 0.2 μm/2.0 μm), whereby an optical element mounting pad, electric wirings and projection formation sheet layers were formed from the stack and the gold/nickel layer (see FIG. 7B).

Subsequently, the stainless steel substrate was etched by using a dry film resist so as to form engagement plate portions in proper positions with respect to the optical element mounting pad. Thus, a shaped substrate having the engagement plate portions was formed from the stainless steel substrate (see FIG. 7C). The shaped substrate had an overall length (Lm) of 13.08 mm. Thereafter, an unnecessary portion of the insulation layer was etched away in substantially the same manner as described above by using a dry resist film (see FIG. 8A). The dry resist films used in the respective steps were removed with the use of an aqueous sodium hydroxide solution.

After a silver paste was applied onto a surface of the optical element mounting pad, a light emitting element of a wire bonding type (SM85-1N001 manufactured by Optowell Co., Ltd.) was mounted on the optical element mounting pad via the silver paste by means of a high-precision die bonder (mounting machine). In turn, the silver paste was hardened by a curing process. Thereafter, the light emitting element and its peripheral portion were sealed with a transparent resin (NT-8038 manufactured by Nitto Denko Corporation) by potting (see FIG. 8B). In this manner, the board unit was produced. The engagement plate portions of the board unit had a vertical dimension of 2.0 mm and a horizontal dimension of 2.0 mm, and the board unit had an overall length (Lc) of 14.05 mm.

Production of Optical Sensor Module

One of the engagement plate portions of the board unit and a corresponding one of the projections were brought into fitting engagement with a corresponding one of the board unit engaging vertical grooves of the optical waveguide unit. Then, the other engagement plate portion and the other projection were brought into fitting engagement with the other vertical groove, and lower edges of the engagement plate portions were brought into abutment against a surface of the acryl plate. At this time, the projections of the board unit were deformed in abutment against the bottoms of the vertical grooves. Thereafter, the engagement plate portions were respectively fixed in the vertical grooves with an adhesive. Thus, an optical sensor module was produced (see FIGS. 1A and 1B).

Conventional Example

A board unit was produced in substantially the same manner as in the inventive example described above, except that the projections were not provided. The board unit was designed so as to have an overall length equal to the distance (Ls) between the bottoms of the opposed vertical grooves, but actually the overall length was greater than the distance (Ls). The other components of the optical sensor module were produced in the same manner as in the inventive example. In the conventional example, the board unit was warped in a direction such that the light emitting element was displaced away from the light transmission face of the core.

Optical Coupling Loss

Five optical sensor modules (sample number N=5) were prepared for each of the inventive example and the conventional example. Then, current was fed through the light emitting element of each of the optical sensor modules to cause the light emitting element to emit light. Then, the intensity of light emitted from a distal end portion of the optical sensor module was measured, and an optical coupling loss was calculated. The average and the deviation of the optical coupling losses were also determined. The results are shown below in Table 1.

TABLE 1

|  | Inventive Example | Conventional Example |
| --- | --- | --- |
| Optical coupling | 20.96 | 22.02 |
| loss (dB) (N = 5) | 20.33 | 21.04 |
|  | 20.96 | 21.71 |
|  | 20.82 | 21.62 |
|  | 20.65 | 21.53 |
| Average (dB) | 20.74 | 21.59 |
| Deviation | 0.26 | 0.49 |

The averages of the optical coupling losses shown in Table 1 indicate that the inventive example was smaller in optical coupling loss than the conventional example. Further, the deviations of the optical coupling losses shown in Table 1 indicate that the inventive example was smaller in variations in optical coupling loss than the conventional example.

In the above inventive example, the board unit includes the projections provided-on the opposite sides thereof. An optical sensor module including a single projection provided on only one side of a board unit thereof (see FIG. 10) had substantially the same results as in the above inventive example. Further, an optical sensor module including projections provided on a surface of a board unit opposite from a light emitting element (FIGS. 11A and 11B) had substantially the same results as in the above inventive example. In the above inventive example, the vertical grooves of the optical waveguide unit each had a generally U-shaped cross section as shown in FIG. 1A. An optical sensor module in which vertical grooves each had a bottom having a smaller width had substantially the same results as in the above inventive example.

The inventive optical sensor module is usable as finger touch position detecting means for a touch panel, or an information communication device, a signal processing device or the like which transmits and processes audio and image digital signals at a higher speed.

Although specific forms of embodiments of the instant invention have been described above in order to be more clearly understood, the above description is made by way of example and not as a limitation to the scope of the instant invention. It is contemplated that various modifications apparent to one of ordinary skill in the art could be made without departing from the scope of the invention.

What is claimed is:

1. An optical sensor module, comprising:
an optical waveguide unit; and
a board unit coupled to the optical waveguide unit and mounted with an optical element;
wherein the optical waveguide unit includes an under-cladding layer, a linear core provided on a surface of the under-cladding layer and serving as an optical path, an over-cladding layer covering the core, and a pair of board unit engaging portions provided in laterally opposite portions of the over-cladding layer with respect to a light transmission face of the core;
wherein the board unit includes a substrate, an optical element mounted on a predetermined portion of the substrate, a pair of to-be-engaged portions provided at laterally opposite portions of the optical element for fitting engagement with the board unit engaging portions, and a projection protruding laterally from at least one of the to-be-engaged portions and less rigid than the substrate;
wherein the optical waveguide unit and the board unit are coupled to each other with the to-be-engaged portions and the projection of the board unit in fitting engagement with the board unit engaging portions of the optical waveguide unit and with the projection being deformed in abutment with a corresponding one of the board unit engaging portions without warpage of the board unit.

2. The optical sensor module according to claim 1,
wherein the board unit engaging portions are vertical grooves extending thicknesswise of the optical waveguide unit,
wherein the vertical grooves each have a bottom having a width that is not greater than twice a thickness of each of the to-be-engaged portions,
wherein the projection of the board unit is positioned on the bottom of one of the vertical grooves.

3. The optical sensor module according to claim 2, wherein the projection of the board unit is made of copper.

4. The optical sensor module according to claim 1, wherein the projection of the board unit is made of copper.

* * * * *